US009293228B2

(12) United States Patent
Stucker et al.

(10) Patent No.: US 9,293,228 B2
(45) Date of Patent: Mar. 22, 2016

(54) ADVANCED FIRST CORE FUEL ASSEMBLY CONFIGURATION AND METHOD OF IMPLEMENTING THE SAME

(75) Inventors: David L. Stucker, Chapin, SC (US); Robert J. Fetterman, Gibsonia, PA (US); Jeffrey L. Bradfute, Irmo, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 770 days.

(21) Appl. No.: 13/451,050

(22) Filed: Apr. 19, 2012

(65) Prior Publication Data
US 2012/0294406 A1 Nov. 22, 2012

Related U.S. Application Data

(63) Continuation of application No. 10/966,907, filed on Oct. 15, 2004, now abandoned.

(51) Int. Cl.
*G21C 3/326* (2006.01)
*G21C 3/334* (2006.01)
*G21C 5/00* (2006.01)
*G21C 19/20* (2006.01)

(52) U.S. Cl.
CPC ........ *G21C 3/326* (2013.01); *G21C 5/00* (2013.01); *G21C 19/205* (2013.01); *G21C 2003/3265* (2013.01); *G21Y 2002/201* (2013.01); *G21Y 2004/403* (2013.01); *Y02E 30/38* (2013.01)

(58) Field of Classification Search
None
See application file for complete search history.

(56) References Cited

U.S. PATENT DOCUMENTS

| 3,432,389 A | 3/1969 | Stern |
| 4,280,874 A | 7/1981 | Kawai et al. |
| 4,324,615 A | 4/1982 | Kobayashi et al. |
| 4,451,427 A * | 5/1984 | Ross et al. ............... 376/267 |
| 4,574,069 A | 3/1986 | Ross et al. |
| 5,093,070 A | 3/1992 | Koyama et al. |
| 5,272,736 A | 12/1993 | Wolters, Jr. et al. |
| 5,631,939 A * | 5/1997 | Haraguchi et al. ........ 376/349 |
| 5,636,328 A | 6/1997 | Kautz et al. |
| 5,781,604 A | 7/1998 | Haikawa et al. |

(Continued)

FOREIGN PATENT DOCUMENTS

| JP | S57197490 A | 12/1982 |
| JP | 61-128185 | 6/1986 |
| JP | 2001-124884 | 5/2001 |

OTHER PUBLICATIONS

Y. Komano et al., Japanese Technical Paper entitled "Full MOX Core Design for PWR", JAERI-Conf, 99-014 pp. 24-35, 113-124, published in 1999.

*Primary Examiner* — Jack W Keith
*Assistant Examiner* — Sean P Burke
(74) *Attorney, Agent, or Firm* — Joseph C. Spadacene; Westinghouse Electric Company LLC

(57) ABSTRACT

An advanced initial core fuel configuration is for improving the fuel management efficiency and thus economics for a nuclear reactor. A method of implementing such an initial core involves providing a plurality of fuel assemblies having different average enrichments of uranium 235 and arranging the fuel assemblies in an initial core configuration structured to emulate a known equilibrium reload cycle core at least in terms of spatial reactivity distribution. The resulting average enrichment within the initial core ranges from below about 1.0 percent weight of uranium 235 to about 5.0 percent weight of uranium 235. An advanced lattice design is also disclosed.

13 Claims, 6 Drawing Sheets

(56) References Cited

U.S. PATENT DOCUMENTS

| | | |
|---|---|---|
| 5,822,388 A | 10/1998 | Kantrowitz et al. |
| 5,923,717 A | 7/1999 | Fawks, Jr. |
| 6,005,905 A | 12/1999 | Yamanaka et al. |
| 6,141,396 A | 10/2000 | Kanda et al. |
| 6,233,302 B1 | 5/2001 | Kantrowitz et al. |
| 6,236,038 B1 | 5/2001 | Givet |
| 6,236,039 B1 | 5/2001 | Lee |
| 6,263,038 B1 | 7/2001 | Kantrowitz et al. |
| 6,404,437 B1 | 6/2002 | Russell, II et al. |
| 6,445,759 B1 | 9/2002 | Hiraiwa et al. |
| 6,504,889 B1 | 1/2003 | Narita et al. |
| 6,658,078 B2 | 12/2003 | Anegawa et al. |
| 6,748,348 B1 | 6/2004 | Russell, II |
| 6,862,329 B1 | 3/2005 | Kropaczek et al. |
| 6,891,912 B1 | 5/2005 | Lukic et al. |
| 6,931,090 B2 | 8/2005 | Chao et al. |
| 6,934,350 B1 | 8/2005 | Challberg et al. |
| 7,224,761 B2 | 5/2007 | Popa |
| 2004/0151274 A1 | 8/2004 | Kropaczek et al. |
| 2004/0196946 A1 | 10/2004 | Chao et al. |
| 2004/0220787 A1 | 11/2004 | Russell, II et al. |
| 2004/0243370 A1 | 12/2004 | Kropaczek et al. |

\* cited by examiner

VERY LOW ENRICHMENT (4)   LOW ENRICHMENT (60)

MEDIUM ENRICHMENT (48)   MEDIUM ENRICHMENT WITH INTEGRAL FUEL BURNABLE ABSORBER (20)

HIGH ENRICHMENT (48)   HIGH ENRICHMENT WITH INTEGRAL FUEL BURNABLE ABSORBER (84)

GUIDE TUBE (24)   INSTRUMENT TUBE (1)

ADVANCED FIRST CORE FUEL ASSEMBLY CONFIGURATION AND METHOD OF IMPLEMENTING THE SAME

CROSS-REFERENCE TO RELATED APPLICATION

This application is a continuation application of application Ser. No. 10/966,907, filed Oct. 15, 2004, entitled "ADVANCED FIRST CORE FUEL ASSEMBLY CONFIGURATION AND METHOD OF IMPLEMENTING THE SAME."

BACKGROUND OF THE INVENTION

Field of the Invention

The present invention relates generally to fuel assemblies for a nuclear reactor and, more particularly, to an advanced method of fuel management through arrangement of nuclear fuel assemblies within the initial core of a pressurized water reactor. The invention also relates to advanced initial cores for pressurized water nuclear reactors.

BACKGROUND INFORMATION

Modern commercial nuclear power reactors are fueled with uranium having a slightly enriched U-235 content. The core of the reactor is formed by numerous elongated, rectangular fuel assemblies arranged in a cylindrical vessel. The fuel assemblies are arranged in accordance with a loading pattern intended to meet certain engineering requirements, such as the distribution of power, including limits on power peaks within the core. Other considerations include the maximization of the fuel cycle, or the time required between refuelings. The initial loading configuration and plan of replacement and arrangement of fuel during the life of the reactor is known as in-core fuel management, and is a major nuclear reactor design consideration. Use of the slightly enriched U-235 fuel necessitates that portions of the core be periodically removed and replaced with new or fresh fuel. Thus, it is common to combine fuel assemblies from previous fuel cycles with new fuel. A typical inventory of fuel assemblies includes about one-third new fuel assemblies, commonly referred to as feed assemblies, about one-third once-burned fuel assemblies and about one-third twice-burned fuel assemblies.

Accordingly, the fuel loading pattern for the first core of a nuclear reactor, such as a pressurized water reactor, commonly utilizes three enrichment zones, based upon the average enrichment of U-235 of the fuel assemblies with a given zone, with each zone having generally equal proportions. FIG. 1 shows a schematic representation of such a known prior art loading pattern 2 which uses three generally equal-sized fuel batches 4,6,8. A batch is a group of fuel assemblies that are typically placed into, and then permanently removed from, the core 14 together. Note that the pattern shown in FIG. 1 illustrates only one-eighth of the reactor core 14 and assumes core symmetry. The zones include two low enrichment zones 4, 6 which, as shown, are generally loaded in a checkerboard fashion toward the reactor interior 10, and a high enrichment zone 8, which is loaded primarily at the reactor periphery 12.

The length of the fuel reload cycle for cores 14 assembled in accordance with the foregoing arrangement is adjusted by varying the enrichments of all of the zones 4, 6, 8 in a substantially equal manner. However, this results in the disadvantage of relatively poor fuel utilization due primarily to high neutron leakage caused by the high enrichment zone 8 being disposed at the reactor periphery 12. Additionally, the use of three generally equal-sized regions in zones 4, 6, 8 is inconsistent with current industry fuel management practices with regard to reload cycles, wherein the refueling fraction varies as a function of the desired cycle length. A cycle is the time during which the arrangement of normally stationary fuel in the reactor core is unchanged, usually beginning with the placement of a feed batch, or a batch of fresh fuel, into the core, and ending with the removal of highly burned fuel assemblies. The number of burns a fuel assembly has experienced is the number of cycles it has been in the reactor core. A typical cycle might range from 10 to 18 months in duration. By way of example, 18-month cycles in accordance with the aforementioned prior art require about 40% of the core to be replaced at each cycle, with the replacement typically comprising a mixture of fuel assemblies having both low and high initial enrichments. Therefore, it will be appreciated that the use of equal size batches results in the discharge of low enrichment regions or zones at very low burn-up, while requiring a significant financial investment. Accordingly, such practice is inefficient and uneconomical. The greatest savings in overall fuel costs is achieved by minimizing the initial enrichment required to achieve an equilibrium fuel management scheme.

Further adding to the inefficiency of known prior art methods for establishing initial cores is the fact that such methods are essentially ad hoc basis, performed on a substantially trial and error basis relying on years of experience in the art. There is no systematic approach for developing the first core. As such, initial cores created by such methods must be conservatively designed, with a built in margin for error, which results in the core taking longer than necessary to reach equilibrium, thereby raising costs.

It is desirable, therefore, to avoid the substantial fuel cycle cost penalties associated with known initial core nuclear fuel management schemes. There is a need, therefore, for an advanced method of implementing initial cores for nuclear reactors.

Accordingly, there is room for improvement in the art of in-core fuel management for nuclear reactors including initial core fuel assembly arrangement and in methods of implementing the same.

SUMMARY OF THE INVENTION

These needs and others are satisfied by the present invention, which is directed to a method of loading an initial core for a nuclear reactor such that it substantially emulates the highly economical and efficient equilibrium cycle reload core of a nuclear reactor.

As one aspect of the invention, a method of implementing an economical initial core for a nuclear reactor comprises: providing a plurality of fuel assemblies having different average enrichments of uranium 235; and arranging the plurality of fuel assemblies in an initial core configuration structured to emulate a known equilibrium reload cycle core at least in terms of spatial reactivity distribution.

The method may include providing bundles of the plurality of fuel assemblies, wherein the bundles include at least highly enriched fuel batches, less enriched fuel batches and least enriched fuel batches. The equilibrium cycle reload core may include batches of feed fuel assemblies, once-burned fuel assemblies and twice-burned fuel assemblies, wherein the feed fuel assemblies have the highest average enrichment of uranium 235, the once-burned fuel assemblies have less enriched fuel and the twice-burned fuel assemblies have the least enriched fuel, and wherein the highly enriched fuel batches of the initial core are approximately the same size and enrichment as the feed fuel batch of the equilibrium cycle reload core.

The method may further include the step of approximating the reactivity of the once-burned fuel batches and the twice-burned fuel batches of the equilibrium cycle reload core in the initial core through use of fuel batches in the initial core which have initial average enrichments based upon the reactivity of the non-zero, beginning of cycle burnup and initial enrichment of the once and twice-burned fuel of the equilibrium reload cycle core.

One or more of the fuel batches of the initial core may include one or more sub-batches comprising fuel assemblies of similar average enrichment. The method may include providing as the highly enriched fuel batches, two high enrichment sub-batches sized and enriched to emulate the feed fuel batches of the known equilibrium reload cycle core. The high enrichment sub-batches may be loaded toward the interior of the initial core and the low enrichment batches of fuel may be primarily loaded at the periphery of the initial core.

The method may include providing an advanced lattice design for the initial core wherein the lattice design is structured to compensate for a large thermal neutron flux peak which results from the highly enriched fuel batches within the initial core configuration being disposed adjacent less enriched fuel batches within the initial core configuration. The advanced lattice design may include a generally square pattern of adjacent rows of fuel rods wherein the fuel rods include at least six different fuel rod types ranging in average enrichment from least enriched to most enriched and wherein the advanced lattice disposes the least enriched fuel rods at the corners of the generally square pattern, the next to least enriched fuel rods at the outermost rows of the generally square pattern and the most enriched fuel rods toward the center of the generally square pattern.

As another aspect of the invention, an advanced initial core for a nuclear reactor comprises: a plurality of fuel assemblies having different average enrichments of uranium 235, wherein the initial core is loaded by arranging the plurality of fuel assemblies in a configuration that emulates a known equilibrium reload cycle core, at least in terms of spatial reactivity distribution.

The advanced initial core may include bundles of the plurality of fuel assemblies wherein the bundles include at least highly enriched fuel batches, less enriched fuel batches and least enriched fuel batches. The equilibrium cycle reload core may include batches of feed fuel assemblies, once-burned fuel assemblies and twice-burned fuel assemblies wherein the feed fuel assemblies have the highest average enrichment of uranium 235, the once-burned fuel assemblies have less enriched fuel and the twice-burned fuel assemblies have the least enriched fuel and wherein the highly enriched fuel batches of the initial core are approximately the same size and enrichment as the feed fuel batch of the equilibrium cycle reload core.

The reactivity of the once-burned fuel batches and the twice-burned fuel batches of the equilibrium cycle reload core may be approximated in the initial core through use of fuel batches in the initial core which have initial average enrichments based upon the reactivity of the non-zero, beginning of cycle burnup and initial enrichment of the once and twice-burned fuel of the equilibrium reload cycle core. One or more of the fuel batches of the initial core may include one or more sub-batches comprising fuel assemblies of similar average enrichment. The highly enriched fuel batches of the initial core may include two high enrichment sub-batches sized and enriched to emulate the feed fuel batches of the known equilibrium reload cycle core. The high enrichment sub-batches may be loaded toward the interior of the initial core and the low enrichment batches of fuel may be primarily loaded at the periphery of the initial core.

The advanced initial core may include an advanced lattice design wherein the lattice design is structured to compensate for a large thermal neutron flux peak which results from the highly enriched fuel batches within the initial core configuration being disposed adjacent less enriched fuel batches within the initial core configuration.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to a method of implementing initial cores for pressurized water nuclear reactors using data for an 18-month equilibrium cycle reload core as a design target, although it will become apparent that it could be equally applicable to other fuel reloading cycles regardless of the number of fuel batches used. It will also be appreciated that the figures and corresponding disclosure herein merely provide representative examples of initial cores generated through application of the method of the present invention and are, therefore, not limiting upon the scope of the invention.

Before proceeding with a more detailed description of the present invention, it is important to provide an overview of terminology commonly employed in the nuclear power industry, as it will be applied herein. Certain such terms were described in the Background Information section hereinbefore. Additional terminology will now be discussed.

As employed herein, the reference to "checkerboard" is used to describe a known prior art reactor core fuel assembly loading pattern wherein fuel assemblies of like enrichment are arranged in a manner analogous similar to the grid of red and black squares on a checkerboard, with fuel assemblies of one enrichment (e.g., once-burned fuel) being disposed in a position corresponding to the red squares of the checkerboard, and fuel assemblies of another enrichment (e.g., twice-burned fuel) being disposed in the staggered, adjacent positions corresponding to the black squares of the checkerboard.

The term "equilibrium" is typically used with reference to the highly desirable, substantially stable state of the reactor core which is traditionally achieved after several fuel reload cycles following the initial core cycle. Once achieved, the equilibrium cycle provides very efficient operation (e.g., fuel burn) and predictable, economical reloading of the core at subsequent reload cycles. Accordingly, it is usually desirable to achieve an equilibrium in-core fuel management scheme as early as possible in the plant lifetime. In equilibrium, the feed assemblies will always have substantially the same enrichment and will be placed in the same locations as the previous feed assemblies and the once-burned and twice-burned assemblies that remain in the core, will be shuffled to identical locations occupied by the previously once and twice-burned assemblies.

As employed herein, the term "bundle" refers to one or more than one (i.e., a plurality) fuel assembly.

The term "lattice" refers to the array of fuel within a fuel assembly and the particular arrangement of individual fuel rods within such array.

The advanced fuel assembly configuration of the present invention results in a first core loading pattern that closely emulates the spatial reactivity distribution of such desirable equilibrium reload core.

Figure 1:
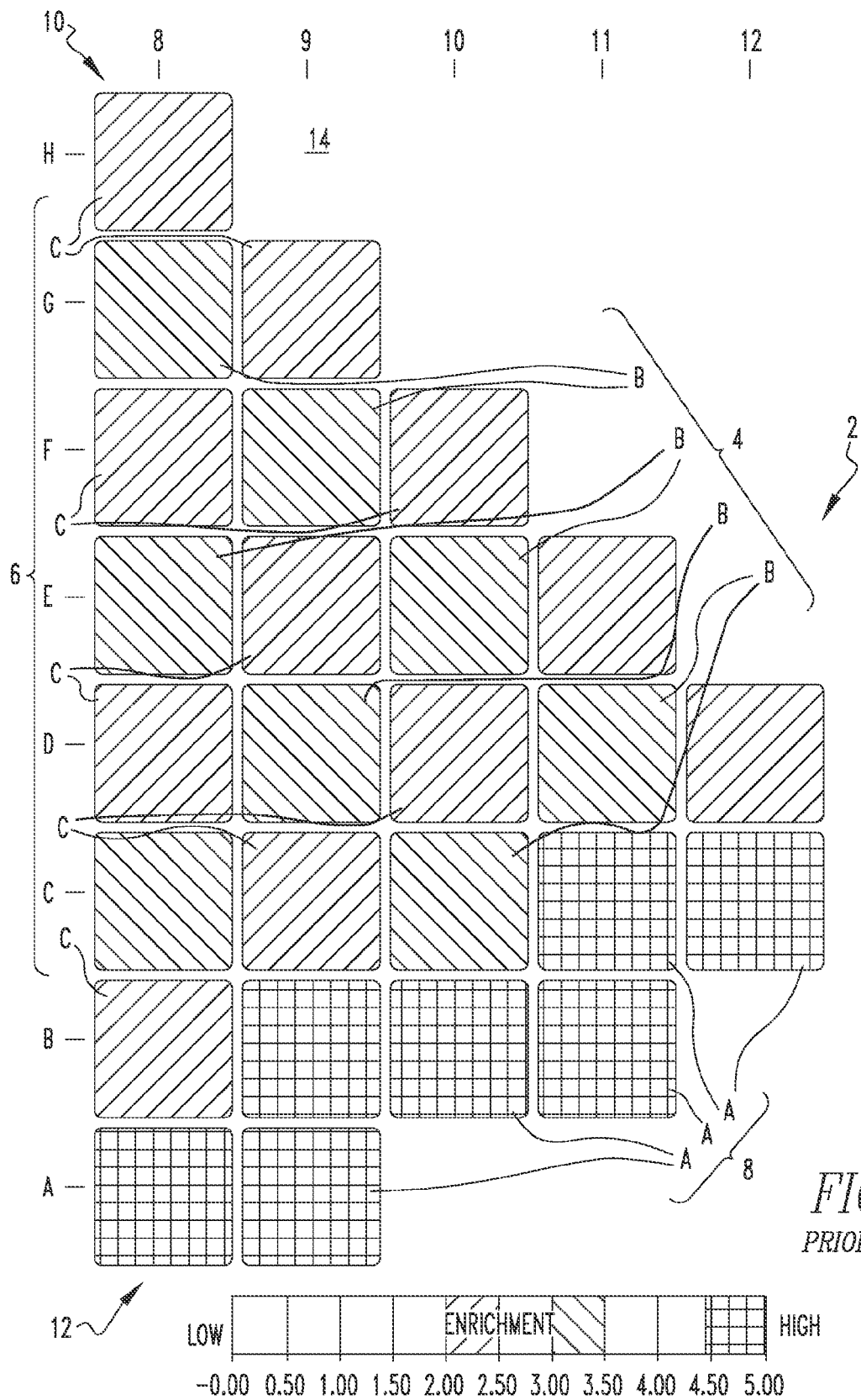
FIG. 1 is a schematic diagram of the loading pattern of a nuclear reactor first core, showing one-eighth of the core and assuming core symmetry.
Figure 2:
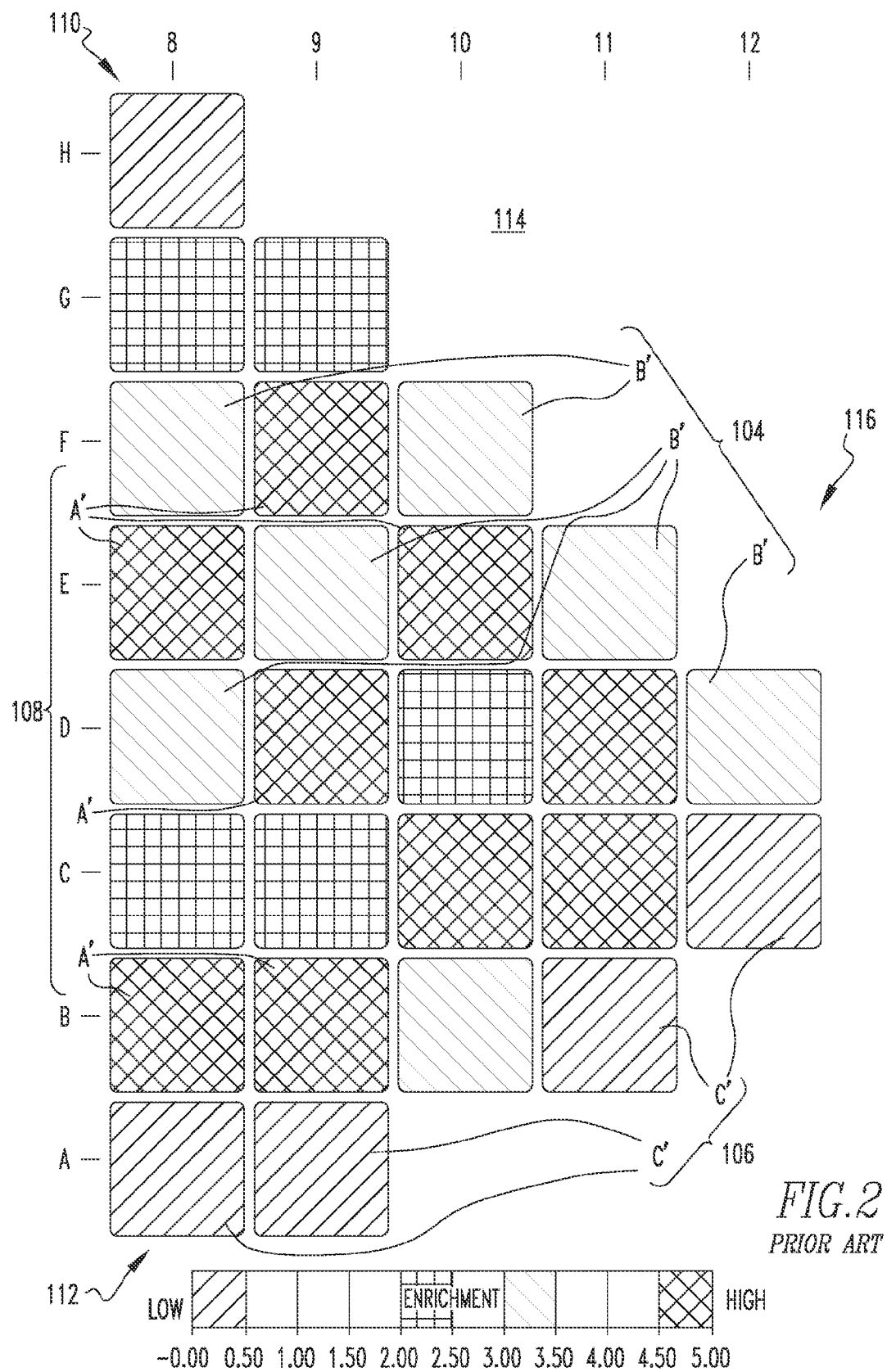
FIG. 2 is a schematic diagram of an equilibrium cycle reload core for a nuclear reactor.

Comparing the initial core of the present invention with, for example, the known prior art initial core fuel assembly arrangement of FIG. 1, and with the desired equilibrium core of FIG. 2, which is typically achieved after several reload cycles following the initial core cycle of FIG. 1, will help to provide a clear understanding and appreciation of the present invention.

Figure 1A:
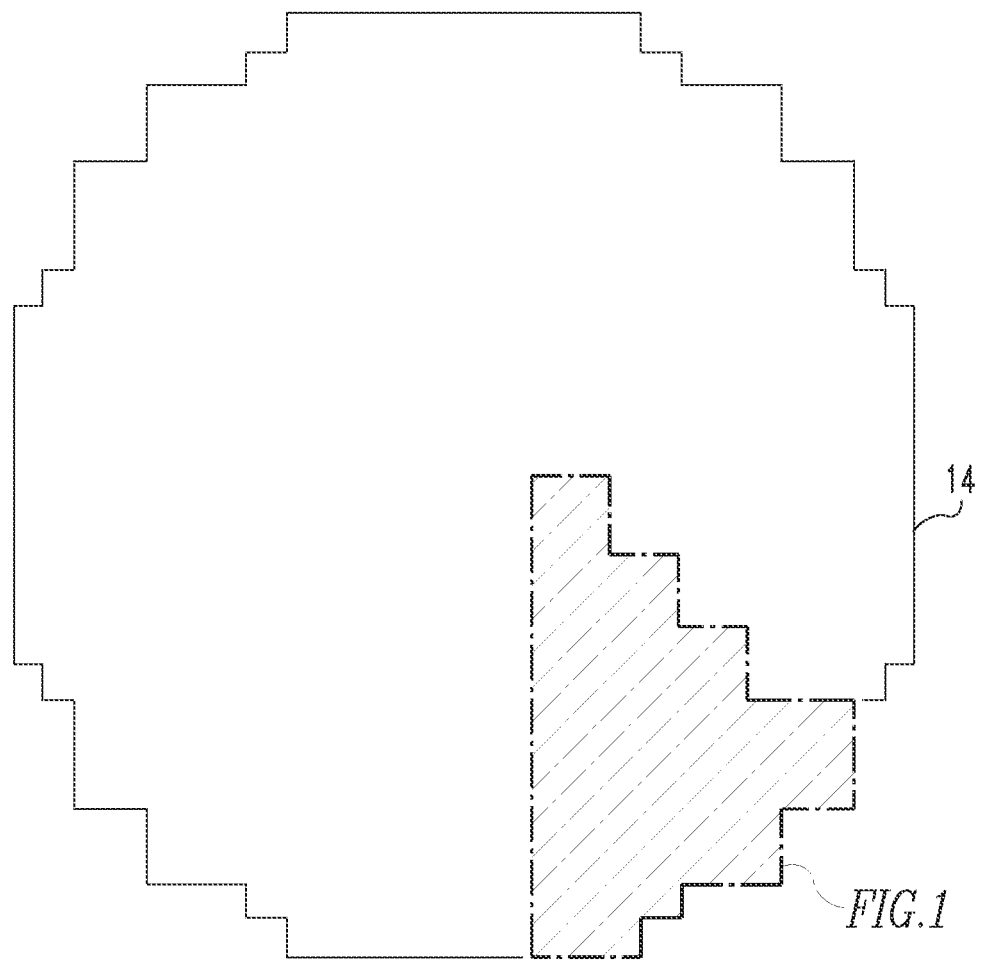
FIG. 1A is a schematic diagram of the entire core, shown as an outline in phantom line drawing, and highlighting the location within the core of the one-eight section of FIG. 1.

FIG. 1, as previously discussed, shows a known prior art reactor core loading pattern 2, as represented in a schematic diagram of one-eighth of the reactor core 14 which is assumed to be symmetric in shape. FIG. 1A shows the outline of the entire core 14 and the location of the one-eighth section thereof, shown in FIG. 1. As shown in FIG. 1, the loading pattern 2 places the highest enrichment zone 8, which includes fuel represented symbolically with the letter A, at the periphery 12 of the core 14. Zones 4, 6 include less reactive, once-burned fuel B and least reactive, twice-burned fuel C, respectively, which are disposed in a checkerboard pattern toward the interior 10 of the core 14, as shown. Such configuration, as previously discussed, results in a reactor power distribution that is peaked near the core periphery 12, where neutrons will leak out of the reactor and never return. Accordingly, the aforementioned fuel assembly arrangement results in poor fuel utilization and economical inefficiency.

Figure 3:
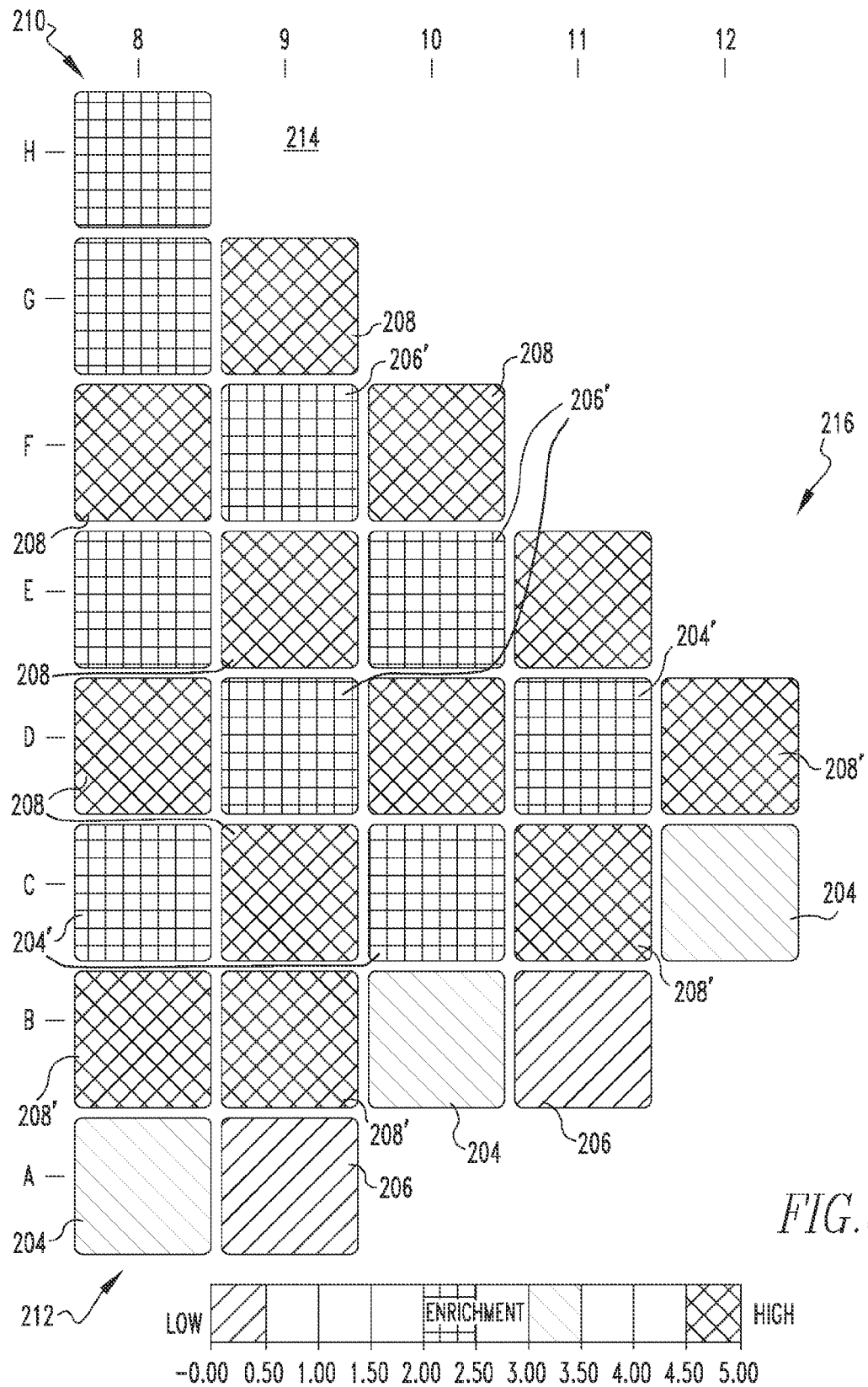
FIG. 3 is a schematic diagram of an advanced initial core in accordance with the present invention.

The advanced initial core (e.g., 214 of FIG. 3) and method of implementing the same, of the present invention, overcome these shortcomings by providing an initial core 214 (FIG. 3) that permits a lower initial enrichment while providing the same energy extraction and establishes a power distribution which remains centrally peaked throughout the burnup cycle. Specifically, the present invention uses the desirable equilibrium cycle reload core 114 (FIG. 2) as a design target and emulates at least the reactivity distribution of the equilibrium core 114 in the initial reactor core 214 (FIG. 3). The reactivity distribution of the equilibrium core 114 (FIG. 2) provides a model for determining the number of discrete regions within the first core loading pattern 216 (FIG. 3) that emulate the fresh (e.g., fuel assemblies A' of zone 108 in FIG. 2), once-burned (e.g., fuel assemblies B' of zone 104 in FIG. 2) and twice-burned fuel (e.g., fuel assemblies C' of zone 106 in FIG. 2) of the target equilibrium reload cycle core 114. The reactivity values for the equilibrium core 114 are obtained through the initial enrichment of the fuel assemblies A, B, C and, to a lesser extent, from the burnable absorber loading of such assemblies. This can be more fully understood by comparing FIGS. 2 and 3, which will now be discussed in further detail.

FIG. 2 shows a schematic representation of the loading pattern 116 of the target equilibrium cycle reload core. Like FIG. 1, FIG. 2 also assumes one-eighth core symmetry. As shown, unlike the high enrichment fuel A of zone 8 in the prior art loading pattern 2 of FIG. 1, the high enrichment fuel assemblies A' are located toward the core interior 110, in zone 108. The highly enriched fuel A' is checkerboarded with once-burned fuel assemblies B', also disposed towards the core interior 110: in zone 104. The least enriched fuel assemblies C' are primarily disposed on the core periphery 112.

FIG. 3 shows a schematic illustration of a representative first core loading pattern 216 and resulting initial core 214 when employing the advanced method of the present invention in order to emulate the desired equilibrium cycle reload core 114 of FIG. 2. Specifically, in accordance with the advanced method of the present invention, the reactivity distribution of the desirable equilibrium cycle reload core 114 is known. Such distribution is illustrated in the example of FIG. 2. Additionally, it is well known that much data, including data relating to such reactivity distribution, is available with respect to equilibrium cycles for nuclear reactors, generally. Such data has been obtained through years of monitoring the equilibrium cycles of various reactors and through the development and application of many known prior art methods (e.g., algorithms) in the nuclear art over the years in an attempt to optimize in-core fuel management. In essence, the advanced method of the present invention involves taking such data and applying it to emulate the reactivity distribution of the highly economic and efficient equilibrium cycle reload core 114 (FIG. 2), in the initial core 214. In other words, the method of the present invention emulates a desired end result (e.g., core equilibrium) which typically takes years to achieve, and achieves a comparable result in an initial step (e.g., the initial core 214 of the reactor), thereby dramatically improving fuel management efficiency and economy. This involves applying known parameters of the desired equilibrium cycle reload core 114, such as the initial enrichment of particular fuel assemblies 104, 106, 108 and the burnable absorber loading or amount of burnup of the assembly, and emulating the reactivity distribution which results from such parameters, using only those fuel assembly parameters which may be varied within the initial core 214. For example, only initial enrichment, batch quantity and location of the fuel assemblies within the core, may be varied because all other parameters are at an initial start up value of zero variability, the initial core has not yet experienced any burnup. Therefore, the method of the present invention backs out an advanced core 214 using known parameters from the desired equilibrium target core and replicating them as closely as possible.

FIG. 3, again illustrates one-eighth of the core 214 and assumes core symmetry. Comparing the initial core 214 of FIG. 3 with the equilibrium cycle reload core 114 of FIG. 2, it is evident that the exemplary initial core 214 succeeds in closely emulating the spatial reactivity distribution of the very economical target equilibrium cycle reload core 114 both in terms of sub-batch quantity and spatial distribution. In order to accomplish this goal, the method of the present invention, unlike the three substantially equal zones of known initial cores (e.g., zones 4, 6 and 8 of FIG. 1), provides a core having essentially any necessary, suitable combination and configuration of fuel batches and sub-batches. Specifically, the enrichments of the exemplary initial core 214 are obtained through use of a group of high enrichment bundles 208 of approximately the same size and enrichment as the equilibrium cycle feed batch 108. Second, the burned fuel 104, 106 in the equilibrium reload cycle core 114 is approximated through use of initial enrichments that approximate the reactivity of the non-zero beginning of cycle (BOC) burnup and initial enrichment of the burned fuel inventory 104, 106 of the equilibrium reload cycle core 114. The resulting enrichment range of the initial core 214 is much larger than the known prior art (see, e.g., FIG. 1). For example, the enrichment of the exemplary initial core 214 of FIG. 3 ranges from about 0.30 to above about 4.5, as measured in weight of U-235. Conversely, by way of comparative example, the representative prior art initial core 14 of FIG. 1 has an enrichment range from about 2.35 to about 4.45 weight of U-235.

Furthermore, the exemplary initial core 214 of FIG. 3 includes two high enrichment sub-batches 208, 208' which are sized and enriched to emulate the fresh fuel region or zone 108 of the equilibrium reload cycle 116. The next two sub-batches 204, 204' are sized similarly to and are enriched to emulate the reactivity of the once-burned portion 104 of the equilibrium cycle reload core 114. Finally, the remaining sub-batches, for example, 206, 206' are sized to reflect the twice-burned portion 106 of the reload core 114 with enrichments being similarly selected to emulate the reactivity of the twice-burned fuel 106 in the equilibrium reload core 114.

In the example of FIG. 3, the two sub-batches of highly enriched fuel 208, 208' are positioned toward the interior 210 of the core 214 rather than at the periphery 212 like the known prior art (see, e.g., highly enriched fuel 8 at core periphery 12 of FIG. 1). The method next involves positioning the pair of sub-batches of fuel 206, 206' emulating the twice-burned fuel 106 of the equilibrium cycle reload core 114 primarily at the periphery 212 of the core 214. The remainder of the fuel within the initial core 214 can be enriched and arranged as needed, in any combination, in order to replicate the desired equilibrium cycle. For example, the initial core 214 shown in FIG. 3 includes two sub-batches 204, 204' sized and enriched to emulate the once-burned fuel 104 of the equilibrium core 214. Such sub-batches 204, 204' are disposed intermittently, as necessary to achieve the desired reactivity distribution. Accordingly, the initial core 214 and method of implementing the same, of the invention, overcomes the disadvantageous neutron leakage of the prior art, premature removal or replacement of highly enriched fuel and the economic inefficiencies associated therewith.

Additionally, because the initial core 214 emulates the reactivity distributions of the equilibrium reload core 114, the time or cycle length to transition to the reload core cycle is dramatically improved. Such improvement is due largely to the much wider range of enrichments and to the unequal sub-batch sizes used in the advanced initial core 214. This set of advanced core design parameters has the effect of minimizing the discharge enrichment of the initial core 214 and, thereby, maximizing the enrichment of the fuel carried over for further exposure within the reactor. The fuel which is carried over from the initial cycle 214 to the reload cycles is of an enrichment and reactivity that is representative of the target reload core 114.

Figure 4:
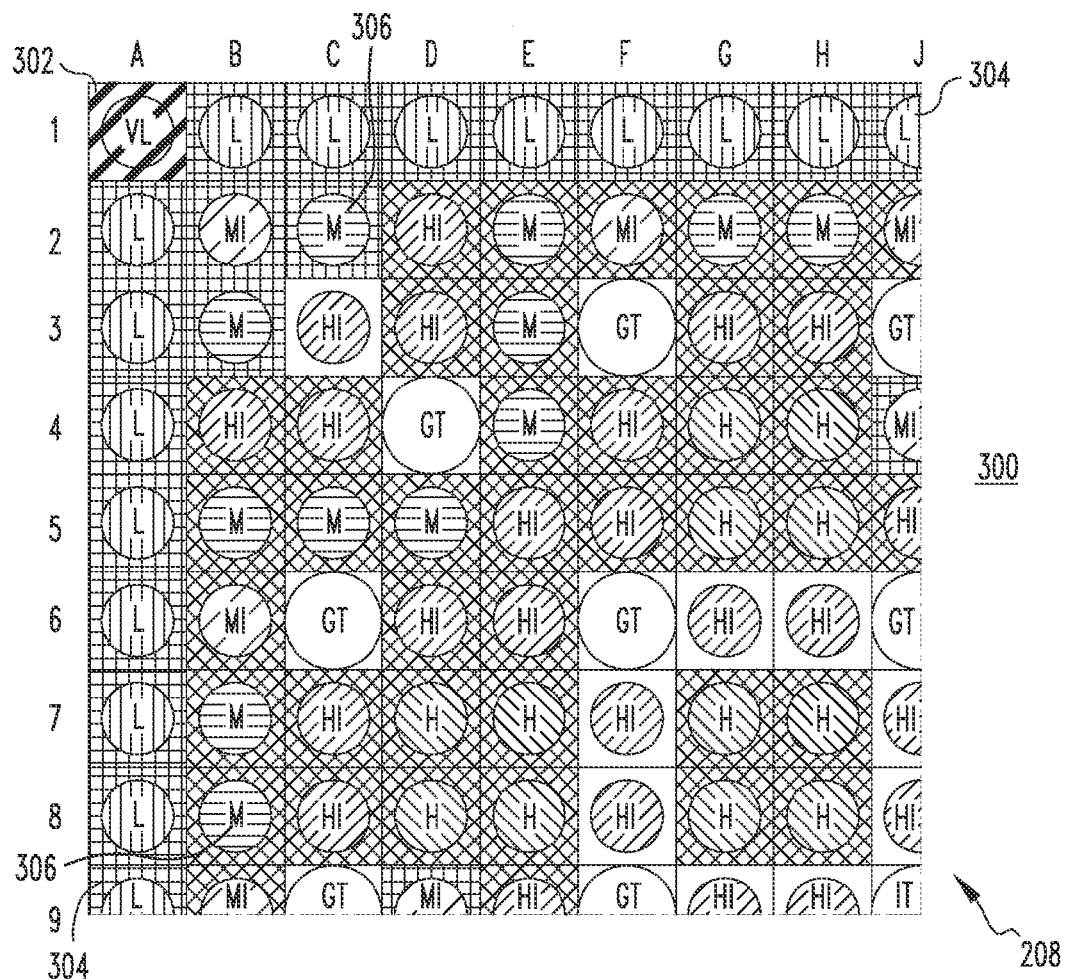
FIG. 4 is a schematic diagram of the upper left quadrant of an advanced lattice design for the initial core of FIG. 3, wherein the fuel rod array shown assumes lattice symmetry.
Figure 4:
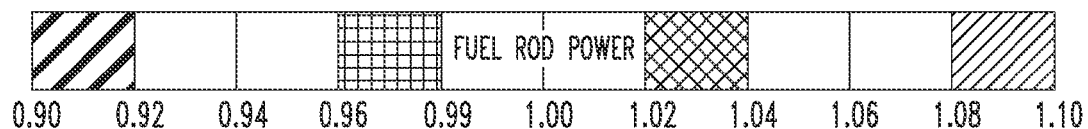
Figure 4:
Figure 4:
Figure 4:
Figure 4:
Figure 4:
Figure 4:
Figure 4:
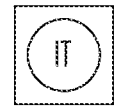
Figure 4:
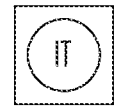
Figures 4, 4A:
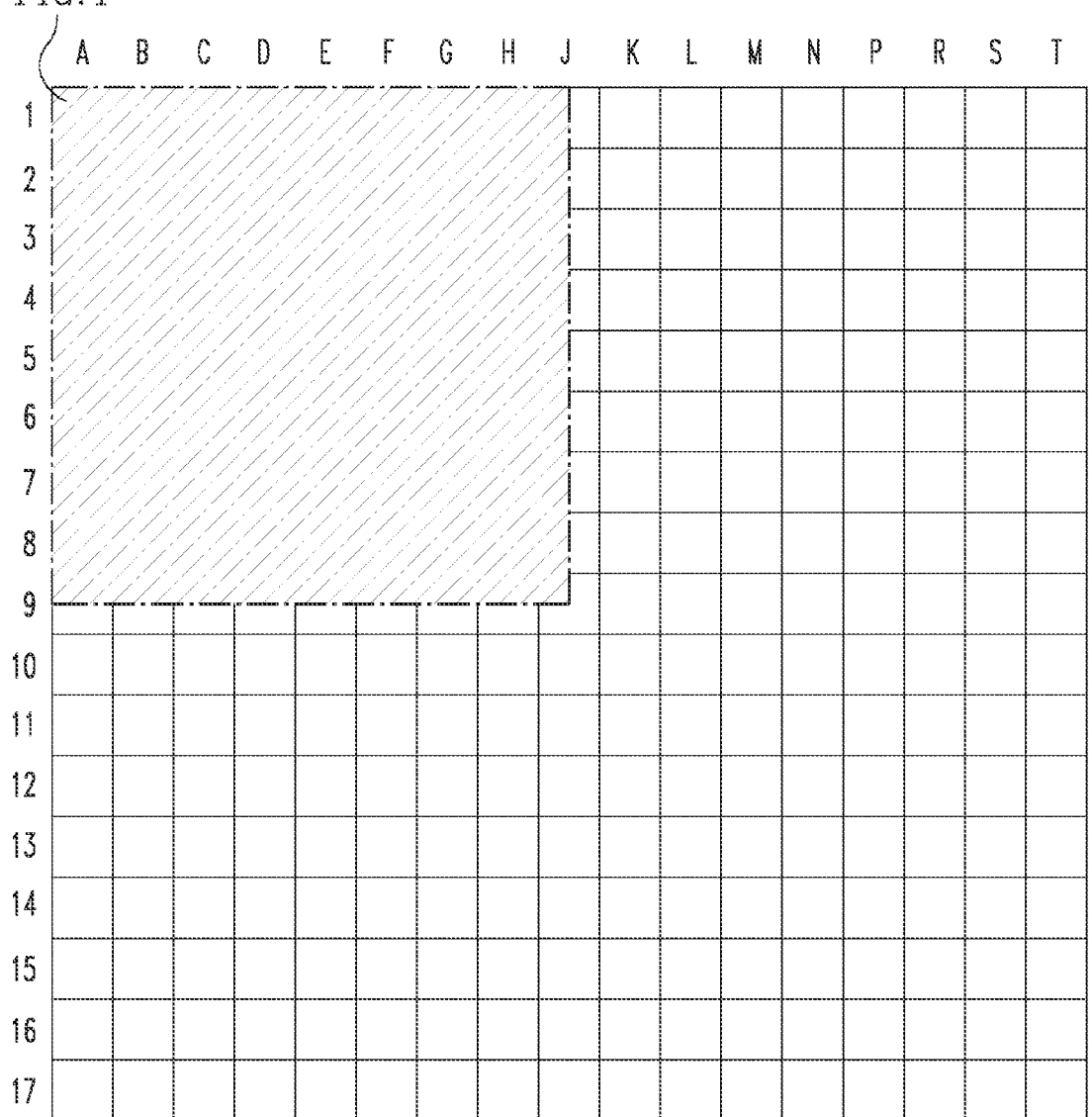
FIG. 4A is a schematic diagram of the entire lattice outlined in phantom line drawing and showing the location therein, of the lattice portion illustrated in FIG. 4.

In order to support the foregoing advanced initial core design 214, an advanced lattice design is required. The lattice is the array of fuel and the particular arrangement of rod locations in a fuel assembly. FIG. 4 shows a representative example of such an advanced lattice design 300 for at least some of the fuel assemblies of the exemplary initial core 214. For ease of illustration, only the upper left quadrant of the lattice 300 is shown. Mirror symmetry in the remaining quadrants is assumed (see FIG. 4A, highlighting the location of the one-quarter section of FIG. 4 within the lattice 300). The lattice 300 is designed to compensate for the highly enriched inboard fuel bundles 208, 208' that are adjacent to low enrichment bundles (e.g., 206, 206'). It is well known that such a fuel loading arrangement will result in a large thermal neutron flux peak at the radial edge rows 304 of the high enrichment bundle 208 due to the very low absorption of the low enrichment bundles 206 (not shown in FIG. 4). This is one aspect of the equilibrium reload core 114 (FIG. 2) that cannot be emulated in the initial core 214 (FIG. 3) because the equilibrium reload core low-reactivity bundles (e.g., 106) are much more highly absorbing of neutrons than the initial core low-enrichment bundles (e.g., 204). This is because the burned bundles of the reload core 114 include highly absorbing fission products and high-order actinides. The initial core low enrichment bundles (e.g., 206, 206') having not been burned, do not possess such absorbing nuclear products.

In known prior art lattice designs (not shown), each fuel rod in a given assembly generally has the same enrichment. A uniformly enriched bundle design, for the highly enriched bundles, would result in unacceptably high power peaking factors within the exemplary initial core 214 (FIG. 3). Thus, the advanced lattice design 300 of the present invention uses six different rod types (see, e.g., the key beneath lattice 300 of FIG. 4) in a configuration designed to reduce peaking factors when the highly enriched assemblies are adjacent lower enriched assemblies (see, e.g., fuel assemblies 208 adjacent fuel assemblies 206' of FIG. 2). Lower enriched in this case refers to enrichments ranging from between about 1 to 2.50 weight of U-235, in order to simulate the reactivity of burned assemblies (e.g., 104, 106).

Specifically, as shown in FIG. 4, radial zoning of the bundle 208 is employed to reduce the enrichment of the fuel rods 302 at the edges of the bundle 208 and, thereby, result in a bundle power distribution that compensates for the unusually high thermal neutron flux at the bundle periphery 212 (FIG. 3). Such enrichment reduction is typically limited to the first two rows 304, 306 of the bundle 208 due to the thermal neutron mean-free path in the high enrichment bundle 208 which is relatively short (e.g., roughly one pitch).

The example of FIG. 4 shows the lattice 300 or how the fuel rods are arranged to form a bundle, such as the high enrichment bundle 208, shown. Six types of fuel rods 302, 304, 306, 308, 310, 312 are employed and range, respectively, in level of enrichment from least enriched to most enriched. As previously discussed, low enrichment in the exemplary case refers to between about 0.3-2.50 weight-percent of U-235. Medium enrichment is preferably between about 2.50-3.50 weight of U-235 and high enrichment is preferably between about 3.50-5 weight of U-235. It will, however, be appreciated that there are variations in enrichment even with these designated categories (e.g., low, medium, high). This will be appreciated with reference to the various enrichments of the fuel assemblies (e.g., A,B,C,A',B',C') and bundles (e.g., 4,6, 8,104,106,108,204,206,208) in FIGS. 1-3 and of the individual fuel rods (e.g., 302,304,306,308,310,312) as designated in the legend under lattice 300 of FIG. 4, wherein VL designates very low enrichment fuel rods 302, L designates low enrichment fuel rods 304, M designates medium enrichment fuel rods 306, MI designates medium enrichment fuel rods with integral fuel burnable absorbers 308, H designates high enrichment fuel rods 310, and HI designates high enrichment fuel rods with integral fuel burnable absorbers 312. It will further be appreciated that the specific enrichment levels and ranges illustrated and discussed herein are merely an example for an initial core (e.g., 214) loaded in accordance with the present invention. A wide variety of alternative arrangements are within the scope of the invention.

The lattice 300 of FIG. 4 has a generally square pattern of adjacent fuel rods. The lowest enrichment fuel rods or very low (VL) enrichment fuel rods 302 are disposed at the corners (one corner, and thus one very low (VL) enrichment fuel rod 302, are shown in FIG. 4) of the lattice 300. The next lowest enrichment rods or low (L) enrichment fuel rods 304 are disposed along the sides or edges of the lattice 300. The fuel rod enrichments then gradually increase as the rod positions approach the center of the lattice 300 where the most highly enriched fuel rods or high enrichment fuel rods with integral fuel burnable absorbers (HI) 312 and high (H) enrichment fuel rods 310 and next to most highly enriched or medium enrichment fuel rods with integral fuel burnable absorbers (MI) 308 are disposed in a symmetric pattern. Accordingly, the foregoing advanced lattice design 300 of the present invention compensates for the thermal flux peak of the environment, primarily caused by the inboard highly enriched bundles 208, 208' (best shown in FIG. 3) of the exemplary initial core 214 (FIG. 3) being adjacent low enrichment bundles 206, 206' (best shown in FIG. 3), by lowering the enrichment at the edges or sides 304 of the lattice 300, thereby reducing such power peaks and supporting the highly efficient and thus economical initial core 214 (FIG. 3) of the present invention.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of implementing an economical first core for a pressurized water nuclear reactor, said method comprising:
providing energy output and discharge burn-up data for substantially all of a plurality of regions that make up a target equilibrium reload cycle core, each of said regions comprising a plurality of equilibrium reload cycle core fuel assemblies;
providing a plurality of new fuel assemblies which when configured in a first core of a pressurized water reactor emulate the energy output and discharge burn-up of the corresponding regions that make up the target equilibrium reload cycle core, each of said new fuel assemblies having a vertical length and having not been previously irradiated in a reactor core, a majority of said new fuel assemblies having a different elemental make up than a corresponding one of the equilibrium reload cycle core fuel assemblies, said new fuel assemblies having different average enrichments of uranium 235 including high enrichment fuel assemblies and low enrichment fuel assemblies; and
arranging said plurality of new fuel assemblies in a first core configuration of a pressurized water reactor based upon said data, in order to emulate said target equilibrium reload cycle core in terms of spatial reactivity distribution, said first core including an interior and a periphery,
wherein said first core is entirely made up of said new fuel assemblies,
wherein substantially all of said high enrichment fuel assemblies are loaded toward the interior of said first core, and
wherein an advanced lattice design and associated structure are provided for at least some of said plurality of new high enrichment fuel assemblies of said first core in which there is no extended barrier which would prohibit cross flow of a coolant over the vertical length of said fuel assemblies, in order that lateral circulation of said coolant across said fuel assemblies is provided as said coolant moves vertically, with the advanced lattice having a peripheral row of fuel rods extending around the sides of the fuel assembly and a number of interior rows of fuel rods wherein most of the fuel rods in the peripheral row have a lower enrichment than most of the fuel rods in the interior rows.

2. The method of claim 1 including providing bundles of said plurality of new fuel assemblies, wherein said bundles include fuel batches each having a number of fuel assemblies with each fuel assembly having an average enrichment of uranium; wherein said fuel batches include high enrichment fuel batches having fuel assemblies substantially each having a high average enrichment of uranium, medium enrichment fuel batches having fuel assemblies substantially each having a medium average enrichment of uranium and low enrichment fuel batches having fuel assemblies substantially each having a low average enrichment of uranium.

3. The method of claim 2 wherein said equilibrium cycle reload core includes batches of feed fuel assemblies, once-burned fuel assemblies and twice-burned fuel assemblies; wherein said batches of feed fuel assemblies, said batches of once-burned fuel assemblies, and said batches of twice-burned fuel assemblies each have an average enrichment of uranium 235, and a size; wherein the size of a particular one of said batches is defined by the quantity of fuel assemblies within the batch; wherein the average enrichment of uranium 235 of said feed fuel assemblies is highest, the average enrichment of uranium 235 of the once-burned fuel assemblies is less than the average enrichment of uranium 235 of said feed fuel assemblies but greater than the average enrichment of uranium 235 of said twice-burned fuel assemblies, and the average enrichment of uranium 235 of the twice-burned fuel assemblies is the least; and wherein said high enrichment fuel batches of said first core are generally the same size and average enrichment as said batches of feed fuel assemblies of said equilibrium cycle reload core.

4. The method of claim 3 wherein each of said once-burned fuel batches and said twice-burned fuel batches of said equilibrium cycle reload core further includes a beginning of cycle burnup, an initial enrichment, and a reactivity; and wherein said method further comprises approximating the reactivity of said once-burned fuel batches and said twice-burned fuel batches of said equilibrium cycle reload core in said first core through use of fuel batches in said first core which have initial average enrichments based upon the reactivity of the beginning of cycle burnup and initial enrichment of said once and twice-burned fuel batches of said equilibrium reload cycle core.

5. The method of claim 3 wherein one or more of said fuel batches of said first core include one or more sub-batches comprising fuel assemblies of substantially the same average enrichment.

6. The method of claim 5 including providing as said high enrichment fuel batches, a plurality of high enrichment sub-batches sized and enriched to emulate said feed fuel batches of said known equilibrium reload cycle core.

7. The method of claim 6 wherein said high enrichment sub-batches are primarily loaded at the interior of said first core; and wherein the low enrichment fuel batches are primarily loaded at the periphery of said core.

8. The method of claim 1 wherein the resulting average enrichment within said first core ranges from about 1.5 percent weight of uranium 235 to about 5.0 percent weight of uranium 235.

9. The method of claim 2 wherein at least one of said high enrichment fuel batches is disposed adjacent at least one of said low enrichment fuel batches within said first core configuration; and wherein said method further comprises the step of employing radial zoning of said fuel assemblies in order that said lattice design is structured to compensate for a large thermal neutron flux peak which results from said highly enriched fuel batches within said first core configuration being disposed adjacent less enriched fuel batches within said first core configuration.

10. The method of claim 9 wherein said advanced lattice design includes a generally square pattern of adjacent rows of fuel rods; wherein said fuel rods include at least six different fuel rod types ranging in average enrichment from least enriched to most enriched; wherein said six different fuel rod types ranging in average enrichment from least enriched to most enriched comprise very low enrichment fuel rods, low enrichment fuel rods, medium enrichment fuel rods, medium enrichment fuel rods with integral fuel burnable absorbers, high enrichment fuel rods, and high enrichment fuel rods with integral fuel burnable absorbers; wherein said generally square pattern has four corners; and wherein said advanced lattice disposes said very low enrichment fuel rods at the four corners of said generally square pattern, said low enrichment fuel rods at the outermost rows of said generally square pattern and said high enrichment fuel rods and said high enrichment fuel rods with integral fuel burnable absorbers toward the center of said generally square pattern.

11. The method of claim 1 wherein each of the new fuel assemblies has one of at least three different average enrichments comprising a highest enrichment, a lower enrichment and a lowest enrichment, wherein the advanced lattice is employed in most of the new fuel assemblies having the highest enrichment that are positioned adjacent at least one of the new fuel assemblies with the lowest enrichment.

12. The method of claim 1 wherein each of the new fuel assemblies has one of at least three different average enrichments comprising a highest enrichment, a lower enrichment and a lowest enrichment, wherein the first core has a peripheral row that extends around the first core that has no fuel assemblies with the highest enrichment.

13. The method of claim 1 including the step of providing the advanced lattice design for at least some of the new high enrichment fuel assemblies that are adjacent to low enrichment fuel assemblies of the initial core, employing radial zoning of the fuel assembly to reduce the enrichment of the fuel rods at the edges of the fuel assembly wherein the lowest enrichment fuel rods are disposed at the corners of the lattice with the next lowest enrichment rods disposed along the sides or edges of the lattice.

* * * * *